July 17, 1928.
W. T. CARLING
POSITIVE CLUTCH
Filed June 20, 1927
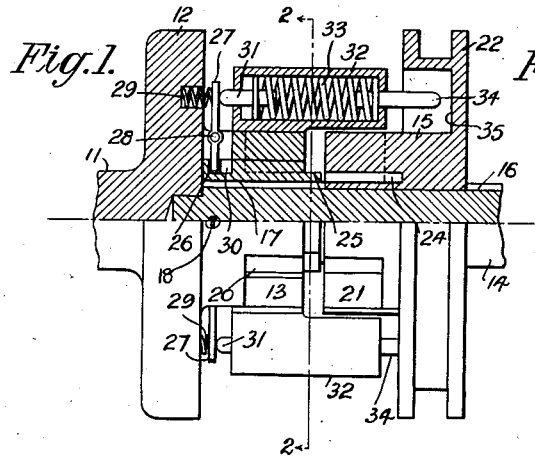
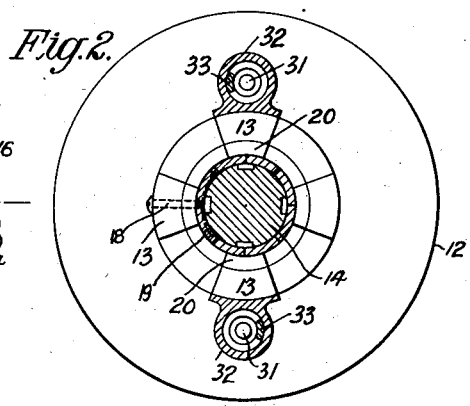
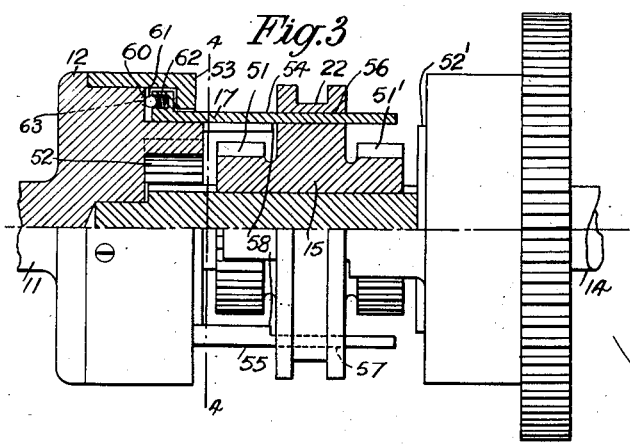
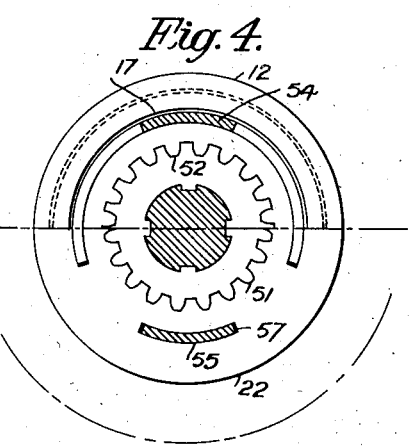
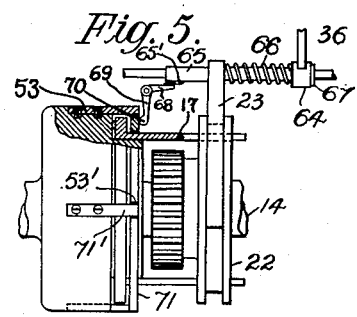
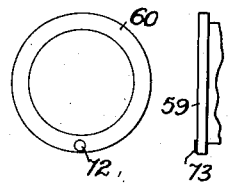
Inventor:—
William T. Carling
By:—
Smith and Michael,
Attorney.

Patented July 17, 1928.

1,677,705

UNITED STATES PATENT OFFICE.

WILLIAM THOMAS CARLING, OF GUILDFORD, ENGLAND.

POSITIVE CLUTCH.

Application filed June 20, 1927, Serial No. 200,241, and in Great Britain June 18, 1926.

This invention relates to clutches of the positive type, such as jaw clutches and like means for coupling together two coaxial rotary members. The invention is particularly suitable for use in conjunction with automobile and other change speed gearing employing constant mesh gears, with or without direct drive, in which the several gears are controlled by the selective engagement of positive clutches, and more particularly on machines where it is possible to regulate the speed of the driving shaft, as for example on automobiles and the like.

In my pending U. S. A patent application Serial No. 127,913, filed August 7th 1926, relating to control mechanism for change speed gears employing constant mesh gears and one-way clutches, means are provided whereby the control mechanism is locked so as to prevent engagement of a one-way clutch so long as the driving member is overrunning the driven member.

The use of one-way clutches for transmitting the drive in automobiles and the like is open to objections, firstly because the engine cannot be used as a brake, and secondly because the driven shaft may overrun the engine shaft, in which event the engine is liable to take up the drive again with a jerk or shock. The use of positive or rigidly engaging clutches is free from both these objections, but their engagement is liable to produce shock unless the two members to be coupled together are rotating at exactly or very nearly equal speeds.

The present invention has for its object to obviate such shock upon engagement, by providing automatic controlling means for preventing the engagement of the jaws or like parts of a positive clutch whilst the two clutch members are rotating at materially different speeds and until they commence to reverse their speed relation, that is until the clutch member which has been overrunning commences to revolve more slowly than the other member.

The invention has also for object to provide means whereby positive clutches can be engaged and disengaged without disconnecting the driving shaft from the engine or the like, by means of a friction clutch for example as is usually done when changing gears in cases where the drive is transmitted through toothed gearing.

The invention has for a further object to provide a clutch controlling element which, while rotating with one of the power transmitting members of the positive clutch, is yet capable of limited angular displacement in relation thereto, which clutch controlling element in one or both limiting positions locks the clutch against inopportune engagement, and in another position (preferably an intermediate position) unlocks the clutch to allow engagement; the displacement of the controlling element to the limiting position or positions in which the engagement is prevented and its replacement to the unlocked position in which the engagement is allowed, are effected by friction between the displaceable controlling element and the other power transmitting member of the clutch, or a surface rotating therewith, the operation of the change speed lever or the like for engaging the clutch applying friction between the controlling element and the second-mentioned clutch member in order to determine the angular displacement, the friction between said parts in the normal disengaged position being relatively small or negligible. Thus the continuous friction between the parts may be reduced to a minimum, until it is required to take effect, the operation of the change speed lever then applying additional or intermittent friction sufficient to produce the angular displacement of the controlling element as soon as the speed-relation of the two clutch members reverses.

The invention has for another object to provide means for detaining the clutch controlling element in the correct intermediate position, with the clutch unlocked for engagement, as soon as the controlling element reaches that position after the angular displacement has been initiated by the operation of the control lever or the like.

The invention further comprises means whereby spring pressure is applied to the sliding clutch member by the change speed lever, the pressure tending to bring this member into the engaged position before the locking mechanism has released it, in order that the spring pressure may automatically engage the clutch at the earliest possible moment.

Referring to the accompanying drawings, Figure 1 is an elevation, partly in section, of one form of construction of a positive clutch embodying the present invention.

Figure 2 is a transverse section of Figure 1 on the line 2—2, looking towards the left.

Figure 3 is an elevation, partly in section, of a second form of construction.

Figure 4 is a transverse section of Figure 3, on the line 4—4, the upper half being as seen when looking towards the left, and the lower half as seen looking towards the right of Figure 3.

Figure 5 represents diagrammatically an arrangement for applying spring pressure to the sliding clutch member, and simultaneously applying friction between the clutch controlling element and the non-sliding clutch member, by the movement of the change gear lever.

Figure 6 is a detail hereafter described.

In Figures 1 and 2, the shaft 11, assumed to be the driving shaft, is integral with the clutch member 12, having four clutch jaws 13 formed thereon; the coaxially disposed shaft 14, assumed to be the driven shaft, supports the driven clutch member 15 which is slidably keyed thereon as by feathers or splines 16. Inside the periphery of the jaws 13, there is rotatably mounted upon the shaft 14, a clutch controlling element 17, held in place by a retaining screw 18, which enters an arcuate slot or channel 19 in the clutch controlling element 17. The latter is provided with auxiliary jaws 20, equal in number to the main driving or power-transmitting jaws 13 and arranged at the same angles as the latter.

The two sets of main and auxiliary jaws 13, 20 are equivalent to concentric divisions of an ordinary jaw clutch, the main set of jaws (in this case the outer set 13) being rigidly fixed upon the driving shaft 11, and the auxiliary set being rotatable to a limited extent relatively to the main set.

The slidable or driven member 15 of the clutch is provided with integral jaws 21 corresponding with the jaws 13 and 20, and of radial depth equal to the combined depth of the two latter, so that in the engaged position of the clutch the jaws 21 will fill the gaps between the pairs of radially aligned jaws 13, 20. The driven member 15 is provided externally with a grooved collar 22 allowing it to be engaged by a striking fork of usual kind (not shown). The member 15 is also formed with an annular channel 24, adapted to receive a sleeve 25 integral with the clutch controlling element 17, the sleeve entering the channel only after the slidable driven member 15 has commenced to move towards engagement; the sleeve 25, which may be split radially, is a sufficiently tight fit in the channel 24 to produce the necessary frictional torque for displacing the controlling element 17.

The angular length of the arcuate slot or channel 19 is sufficient to allow a limited angular displacement of the clutch controlling element 17 relatively to the driving member 12. In the two limiting positions (not shown), the main and auxilary jaws 13 and 20 are in staggered relation, preventing the engagement of the jaws 21 therewith, so that the clutch is locked against engagement; Figures 1 and 2 represent an intermediate position in which the jaws 20 register with the jaws 13, in readiness for the engagement of the jaws 21 when the latter come into the line with the jaws 13 and 20 and when the slidable clutch member 15 is operated by means of the gear change lever or the like.

Provision is made for temporarily holding the controlling element in unlocked position to allow relative angular movement between the power-transmitting jaws 13 and 21, sufficient to bring them into position for engagement, in the event of all the jaws not registering simultaneously when the clutch controlling element 17 attains the unlocked position.

The clutch controlling element 17 is formed with an annular groove 26 in the same plane as the arcuate slot 19, but of less depth than the latter, the groove 26 being adapted to receive the inner ends of a pair of trigger levers 27 pivotally mounted at 28 upon the driving member 12; the outer ends of these triggers are acted upon by springs 29, enclosed in recesses in the member 12, which springs press the triggers against the adjacent face of the groove 26. The opposite face is formed with notches 30 at such positions that they register with the inner ends of the triggers 27 when the main and auxiliary jaws 13 and 20 are in line, at the intermediate (unlocked) position of the controlling element.

The outer ends of the trigger levers 27 can also be engaged by slidable pins or push rods 31, mounted in guide cylinders 32 secured, as by screws (not shown) upon the exterior of the clutch member 12, 13, compression springs 33 being fitted inside the cylinders between the pins 31 and similar pins or push rods 34 at the opposite end; the projecting extremities of the pins 34 are engaged by a concentric surface 35 on the slidable member 15 when the latter is moved to engage the clutch, the springs 33 being thereby compressed so as to urge the pins 31 to move the triggers 27 into the notches 30 against the action of the springs 29. This movement of the triggers acts to detain the clutch controlling element 17 in the intermediate (unlocked) position, so that the jaws 21 can be engaged by the pressure of the control lever as soon as the jaws 13 and 20 come into line with them.

This is an important feature of the invention, for if no provision were made for maintaining the clutch controlling element 17 in the unlocked (intermediate) position until the engagement of the main jaws 13 and 21 of the clutch, then before such engagement could take place, the clutch controlling element 17 would by continuing its angular movement come into the other locking position at the opposite limit of its displacement, thereby again locking the clutch against engagement.

Assuming that the construction shown in Figures 1 and 2 represents the direct-drive jaw clutch of an automobile gear box, and that it is required to change from a lower gear to the direct drive, the driver first releases the accelerator pedal, thereby removing the driving torque from the gear clutch previously in operation and facilitating its disengagement. The gear changing lever, after freeing the lower gear, is then actuated to slide the clutch member 15 into engagement; this brings the sleeve 25 into frictional engagement with the channel 24. So long as the engine is rotating faster than the driven shaft 14 of the direct-drive clutch, the friction of the clutch controlling element 17 upon the driven member 15 causes the auxiliary jaws 20 to remain in the staggered position, in which position the clutch cannot be engaged. When however the engine slows down and commences to rotate more slowly than the driven shaft 14, the friction of the clutch controlling element 17 upon the driven member 15 drags the said element forward into the intermediate position shown, where its jaws 20 register with the jaws 13 of the driving member, the inner ends of the trigger levers 27 entering the notches 30 under the action of the springs 33, which are now placed under compression due to the initial movement of the clutch member 15. Continued movement of the gear changing lever then slides the clutch member 15 into engagement, the jaws 21 engaging simultaneously with the auxiliary jaws 20 and the main jaws 13, as soon as the slight difference of speed between the driving and driven members of the clutch has brought the respective jaws into register.

If the engine is allowed to slow down too much before the sliding member 15 is actuated to engage the clutch jaws, the friction of the controlling element 17 upon the driven member 15 will tend to drag forward the element 17 into the other extreme position, where the clutch is again locked against engagement until the driving shaft is accelerated again up to the approximately correct speed. To obviate this drawback, the detaining action of the spring-triggers 27 as already described causes the clutch controlling element 17 to remain in its unlocked position sufficiently long to allow easy engagement of the clutch.

The automatic slowing down of the engine when the gear is to be changed may be effected by any suitable means, for example in accordance with the system of engine control according to my British patent specification No. 234,238, dated April 4th, 1924.

In changing down to a lower gear, the accelerator is momentarily released to remove the drive from the gear clutch in operation, and this clutch is disengaged by the gear lever. The engine speed is then increased slightly beyond that necessary for the lower gear and the gear lever moved towards the desired position; the engagement of the jaw clutch for this gear then takes place automatically as soon as the speeds of its driving and driven members are approximately equal, after the clutch controlling element has taken up its unlocking position.

This arrangement is intended to dispense with the customary disengagement of the friction clutch when changing gear on an automobile, but if preferred the friction clutch may be utilized in the ordinary way.

Figures 3 and 4 show an alternative construction, in which the power transmitting members of the clutch are formed in the known manner by an externally toothed gear 51 and a corresponding internally toothed ring 52, these being integral with the driven member 15 and the driving member 12 respectively. The power transmitting members 51, 52 of the clutch are shown duplicated at 51$^1$, 52$^1$ on the opposite side of the driven member 15, so that the striking collar 22 can control two different gears or positive clutches by sliding axially in the two directions. In this construction, the clutch controlling element has a limited angular displacement relative to the driven member, and is operated by frictional engagement with the driving member.

The angularly displaceable clutch controlling element 17, rotatably mounted upon the driving member 12 and retained thereon by means of a ring 53, has two projecting fingers 54, 55 passing through arcuate slots 56, 57 in the driven member 15. The frictional engagement between the control element 17 and the driving member 12 is normally of negligible amount but may be increased at the commencement of the operation of engaging the clutch by pressure between the surfaces 59 and 60, which are brought into contact by the member 15 pressing against shoulders 58 on the sides of the fingers 54, 55. Thus the friction during normal running can be reduced as far as is desired, the additional friction for operating the clutch controlling element 17 being produced only at the time when this element is to be displaced.

In order to provide that the clutch members shall be in register, ready for engagement, at the same moment that the clutch controlling element unlocks the clutch, the surface 59 is provided with intermittently engaging means in the form of one or more spring-pressed balls 61, each enclosed in a recess 62 in said surface, the ball being adapted to enter one or more shallow recesses 63 in the surface 60 of the driving member 12; the edges of the recesses 63 are bevelled or rounded so as to allow easy entrance and exit of the ball 61, the relative angular position of the parts being such that the ball enters one of the recesses and thereby causes the controlling element 17 to rotate with the driving member, until the element 17 reaches the unlocked position, whereupon the slidable member can be immediately engaged with the driving member, their teeth and spaces being in exact register.

In order to prevent the engagement of the clutch in the limiting positions of the controlling element 17, the latter is provided with the shoulders 58 on each side of the fingers 54, 55. Upon pressure being applied to the sliding clutch member, if the controlling element 17 is in either of its limiting positions, that is when the clutch members are rotating at different speeds, one or other of the shoulders 58 will contact with the surface of the member at one end of each of the slots, thus preventing the clutch being engaged.

Preferably the gear lever or equivalent means for operating the change speed mechanism is arranged to control the sliding members of the several gear-clutches so as to exert continuous pressure thereon, as by a spring, during the operation of clutch engagement. Figure 5 illustrates a suitable arrangement, in which the gear lever 36 has its boss 64 slidable loosely upon the operating sleeve 65 of the clutch fork 23. When moved towards the left, the boss 64 compresses a spring 66 tending to move the fork 23 to the engaged position, the pressure being maintained by holding the lever either by hand or by a stop or gate of the well known kind; as soon as the clutch controlling element 17 unlocks the clutch, the engagement takes place. Movement of the lever in the opposite direction causes the boss 64 to press upon the flange 67 of the sleeve 65, thereby drawing the clutch fork to the disengaged position. In this construction, the frictional engagement between the clutch controlling element 17 and the driving member 12 is produced by the operation of the gear lever 36, the sliding sleeve 65 actuated by the gear lever being fitted with an enlargement $65^1$ which makes contact with the heel or heels 68 of one or more bell crank levers 69, the opposite ends 70 of which are thereby moved against a disc 71 pressing against the element 17. The disc 71 is mounted at the front edge of the retaining ring 53, the two parts being connected as regards rotary movement by interengaging dogs $71^1$ and notches $53^1$ or the like, so that the disc is displaceable axially to press the element 17 against the adjacent face of the driving member 12.

An alternative arrangement for facilitating engagement of the clutch members in the registering position, consists in providing for substantially increased friction between the controlling element and the clutch member having frictional engagement therewith. For example, as illustrated in Figure 6, the surface 60 of the clutch member may be fitted with inserts 72 of cork or like material of high frictional coefficient, the cooperating surface 59 being provided with projecting areas 73, so arranged that the parts 72, 73 come into line for intermittent engagement with one another in the angular position corresponding to the registering of the clutch members. In the other positions, the projecting areas 73 bear against the smooth metal surface 60, the friction being then of comparatively small amount, but so soon as the registering position is attained the friction is increased sufficiently to maintain this position so as to allow the engagement of the clutch members.

It will be seen from the foregoing description, that the present invention provides means for controlling the engagement of positive clutches, so as to facilitate their engagement at the correct speed-relation and correct relative position of the clutch members, that the control of the clutch engagement is obtained by additional friction or intermittent friction brought about at the commencement of the operation for engaging the clutch, and that the clutch controlling element is detained in correct position relative to one of the clutch members to insure register of the two clutch members at the moment of unlocking.

What I claim is:—

1. In a positive clutch, comprising driving and driven members, and means for sliding one of said members into engagement with the other of said members, a clutch controlling element capable of limited angular displacement relative to the slidable member, said controlling element adapted in one position of displacement to permit engagement of said members together, and frictional means for producing said angular displacement, said sliding means determining the operation of said frictional means.

2. In a positive clutch, comprising driving and driven members, and means for engaging said members together for the transmission of rotary motion, a clutch controlling element capable of limited angular displacement relative to one of said members and adapted in one position of displacement to permit the engagement of said members, means for producing said displacement by friction between said element and the other of said members, and means for detaining said element in said position to permit engagement until said members are in relation for engagement.

3. In a positive clutch, comprising driving and driven members, and means for coupling said members together by relative sliding movement, a clutch controlling element adapted for frictional engagement with one of said members and capable of limited angular movement relative to the other of said members, said element adapted in one position to permit the coupling together of said members, means for bringing about said frictional engagement of said element by the operation of said coupling means, and means for temporarily detaining said element in said position to permit the coupling together of said members.

4. In a positive clutch, comprising driving and driven members, and means for coupling said members together by a relative sliding movement, a clutch controlling element adapted to lock said coupling members against engagement until the speeds of said members are approximately equal, means for operating said element by friction with one of said members, and means for detaining said element in the unlocked position until said members are in correct angular relation for engagement.

5. In a positive clutch, comprising driving and driven members, and means for coupling said members together by a relative sliding movement, a clutch controlling element adapted to lock said members against engagement, means for producing angular displacement of said element relative to one of said members by friction with the other of said members, and means for detaining said element relative to said last mentioned member, said detaining means becoming operative after said members commence to reverse their speed relation and serving to detain said element in an angular position adapted to ensure register of said clutch members when said element unlocks the clutch.

6. In a positive clutch, comprising driving and driven members, and means for engaging said members together for the transmission of rotary motion, a clutch-controlling element adapted to lock the clutch against engagement until correct relative speed of said clutch members is attained, and means for ensuring correct register of said clutch members at the moment when the locking control ceases to operate.

7. In a positive clutch, comprising driving and driven members, and means for engaging said members together for the transmission of rotary motion, a clutch-controlling element adapted to lock the clutch against engagement until correct relative speed of said clutch members is attained, and intermittently engaging means for ensuring correct register of said clutch members at the moment when the locking control ceases to operate.

8. In a positive clutch, comprising driving and driven members, and means for engaging said members together for the transmission of rotary motion, a clutch controlling element rotatably mounted upon one of said members and capable of limited angular movement relative to the other of said members, said element adapted in one position to unlock the clutch and permit its engagement, means for producing said angular movement of said element by friction with the first mentioned member, and means for detaining said element at a desired position relative to said other clutch member, whereby said clutch members are in register for engagement as soon as said controlling element unlocks the clutch.

9. In a positive clutch, comprising driving and driven members, and means for engaging said members together for the transmission of rotary motion, a clutch controlling element rotatably mounted upon one of said members and capable of limited angular movement relative to the other of said members, said element adapted in one position to unlock the clutch and permit its engagement, and means for producing said angular movement by friction between said element and surfaces associated with said first mentioned member, the friction between said element and said surfaces being determined by operation of said engaging means.

10. In a positive clutch, comprising driving and driven members, and means for engaging said members together for the transmission of rotary motion, a clutch controlling element rotatably mounted in relation to one of said members and angularly displaceable in relation to the other of said members, frictional surfaces associated with the first mentioned member, said friction surfaces adapted upon the operation of said engaging means to make contact with opposite surfaces of said element, and means for detaining said element in desired angular position relative to said other clutch member, for facilitating the engagement of said clutch members when said element unlocks the clutch.

11. In a positive clutch, comprising a driving member, a driven member mounted coaxially therewith, and means for sliding one of said members into engagement with the other, an annular controlling element rotatably mounted upon said driving member, friction surfaces associated with said driving member, means for causing said friction surfaces to make contact with opposite surfaces of said controlling element, said last-mentioned means being actuated by the operation of said sliding means, said controlling element adapted to lock the clutch against engagement until correct relative speed of said clutch member is attained, and means for detaining said element in desired angular position relative to said driving member for facilitating the engagement of said clutch members when said element unlocks the clutch.

12. The combination of a driving shaft, a jaw clutch member secured thereon, a coaxially disposed driven member comprising jaw clutch elements adapted to engage with said jaw clutch member, means for sliding said driven member into engagement with said jaw clutch member, an annular control element mounted rotatably around said jaw clutch member, a retaining ring for said control element, said retaining ring being slidable axially but fixed in the rotary direction upon said jaw clutch member, and means for producing frictional engagement of said jaw clutch member and retaining ring with opposite surfaces of said control element.

In testimony whereof I hereunto affix my signature.

WILLIAM THOMAS CARLING.